(12) United States Patent
Gubser et al.

(10) Patent No.: US 11,009,660 B2
(45) Date of Patent: May 18, 2021

(54) LIGHT GUIDES AND MANUFACTURE OF LIGHT GUIDES

(71) Applicant: Heptagon Micro Optics Pte. Ltd., Singapore (SG)

(72) Inventors: Simon Gubser, Weesen (CH); Qichuan Yu, Singapore (SG); Choon Hein Law, Singapore (SG); Ji Wang, Singapore (SG)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days.

(21) Appl. No.: 16/483,987

(22) PCT Filed: Feb. 9, 2018

(86) PCT No.: PCT/SG2018/050059
§ 371 (c)(1),
(2) Date: Aug. 6, 2019

(87) PCT Pub. No.: WO2018/147808
PCT Pub. Date: Aug. 16, 2018

(65) Prior Publication Data
US 2020/0018899 A1    Jan. 16, 2020

Related U.S. Application Data

(60) Provisional application No. 62/457,307, filed on Feb. 10, 2017.

(51) Int. Cl.
*G02B 6/00*    (2006.01)
*G02B 6/13*    (2006.01)
(Continued)

(52) U.S. Cl.
CPC .............. *G02B 6/13* (2013.01); *G02B 6/0065* (2013.01); *G02B 6/1226* (2013.01)

(58) Field of Classification Search
CPC .. G02B 6/0005; G02B 6/0011; G02B 6/0065; G02B 6/102; G02B 6/122; G02B 1/045;
(Continued)

(56) References Cited

U.S. PATENT DOCUMENTS 3,832,029 A * 8/1974 Bryngdahl .............. G02B 6/06
                                                        385/133
5,136,678 A    8/1992 Yoshimura
(Continued)

FOREIGN PATENT DOCUMENTS

CN         1564032        1/2005
CN         104516055 A    4/2015
(Continued)

OTHER PUBLICATIONS

ISA/SG, International Search Report for PCT/SG2018/050059 (dated May 14, 2018).
(Continued)

*Primary Examiner* — Robert Tavlykaev
(74) *Attorney, Agent, or Firm* — Michael Best and Friedrich LLP

(57) ABSTRACT

The present disclosure describes light guides and a method of manufacturing light guides that include a rectangular prism-shaped bar, a first polymer or metal cladding on four sides of the rectangular prism-shaped bar, and a second polymer cladding disposed on the first polymer cladding on the four sides of the rectangular prism-shaped bar.

13 Claims, 5 Drawing Sheets

(51) Int. Cl.
*G02B 6/122* (2006.01)
*F21V 8/00* (2006.01)

(58) Field of Classification Search
CPC ... G02B 1/046; G02B 1/048; B29D 11/00663
USPC .................................................. 385/129–132
See application file for complete search history.

(56) References Cited

U.S. PATENT DOCUMENTS

| | | | | |
|---|---|---|---|---|
| 5,692,088 | A * | 11/1997 | Ishiharada | G02B 1/048 |
| | | | | 385/125 |
| 5,904,502 | A * | 5/1999 | Ference | H01L 21/56 |
| | | | | 257/E21.502 |
| 6,830,957 | B2 * | 12/2004 | Pu | H01L 21/565 |
| | | | | 257/778 |
| 6,835,787 | B2 | 12/2004 | Tamura et al. | |
| 7,029,607 | B2 * | 4/2006 | Shimizu | B29C 35/0888 |
| | | | | 264/1.25 |
| 8,771,562 | B2 * | 7/2014 | Naito | G02B 1/045 |
| | | | | 264/1.27 |
| 9,429,709 | B2 * | 8/2016 | He | G02B 6/0065 |
| 2005/0158003 | A1 | 7/2005 | Ohtsu et al. | |
| 2005/0287707 | A1 * | 12/2005 | Lin | H01L 21/568 |
| | | | | 438/113 |
| 2006/0158896 | A1 * | 7/2006 | Krupa | A61B 1/0684 |
| | | | | 362/555 |
| 2007/0155049 | A1 * | 7/2007 | Tsai | H01L 21/561 |
| | | | | 438/106 |
| 2011/0286693 | A1 * | 11/2011 | Gotou | G02B 6/138 |
| | | | | 385/14 |
| 2013/0286686 | A1 | 10/2013 | Kettunen et al. | |
| 2014/0059952 | A1 | 3/2014 | Christandl et al. | |
| 2014/0295122 | A1 | 10/2014 | Riel et al. | |
| 2015/0226910 | A1 | 8/2015 | Malinoski | |
| 2016/0280829 | A1 | 9/2016 | Uchigasaki et al. | |
| 2016/0341916 | A1 * | 11/2016 | Meir | G02B 6/02052 |

FOREIGN PATENT DOCUMENTS

| | | |
|---|---|---|
| CN | 104880787 | 9/2015 |
| JP | 2005-289766 | 10/2005 |
| JP | 2007-127882 | 5/2007 |
| WO | 2016/076797 | 5/2016 |

OTHER PUBLICATIONS

Office Action issued from the Chinese Patent Office for related Application No. 201880018219.0 dated May 7, 2020 (14 pages including English Translation).

Shu-An Feng "Optical Fiber and Applications for Same", Mechanical Engineers, Issue 4, Dec. 31, 1988, pp. 33 to 34.

Christos Markos "Broadband Guidance in a Hollow-Core Photonic Crystal Fiber With Polymer-Filled Cladding", IEEE Photonics Technology Letters, vol. 25, Issue 20, Oct. 15, 2013, pp. 2003 to 2006.

Extended Search Report issued from the European Patent Office for related Application No. 18751101.9 dated Jan. 12, 2020 (3 Pages).

* cited by examiner ized sapphire bars disposed on a vacuum injection tool.

LIGHT GUIDES AND MANUFACTURE OF LIGHT GUIDES

FIELD OF THE DISCLOSURE

The present disclosure relates to light guides that can be used, for example, in optoelectronic modules.

BACKGROUND

Light guides are devices designed to transport light from between locations with minimal loss. The light is transmitted through the light guide by total internal reflection. Light guides often are made of optical grade materials such as polycarbonates, epoxies, acrylic resins and glass. Sapphire light guides in the form of rods or slabs are particularly useful for transporting ambient light.

SUMMARY

The present disclosure describes light guided and methods of manufacturing light guides.

In one aspect, for example, the present disclosure describes a method of manufacturing light guides. The method includes injecting a first polymer so as to cover four sides of each of multiple rectangular prism-shaped bars while the bars are disposed side-by-side in a vacuum injection tool. The method includes dicing through the first polymer in regions between adjacent ones of the bars wherein, after the dicing, at least a portion of the first polymer still covers each of the four sides of the bars. A second polymer is injected so as to cover the first polymer on the four sides of the bars. The method also includes dicing through the second polymer in regions between adjacent ones of the bars wherein, after dicing through the second polymer, at least a portion of the first polymer forms a first cladding on the four sides of the bars, and at least a portion of the second polymer forms a second cladding on the first cladding.

In some implementations, a metal layer, applied for example by spray coating, is used as the material for the first cladding instead of the first polymer. In such instances, the first dicing may be omitted (e.g., if the bars are not bonded together after the spray coating).

Some implementations include one or more of the following features. For example, the method can include separating (e.g., dicing) at least one of the bars into multiple singulated light guides, each of which comprises a portion of the bar surrounded on four sides by the first and second cladding.

In some instances, the method includes injecting the first polymer into: (i) regions between adjacent ones of the bars, (ii) a first space between a lower surface of each bar and a first opposing surface of a first vacuum injection tool, and (iii) a second space between an upper surface of each bar and a second opposing surface of the first vacuum injection tool. The method can include curing the first polymer, removing the bars from the first vacuum injection tool and placing the bars on a first dicing tape, and dicing through the first polymer while the bars are on the first dicing tape.

In some cases, the method includes injecting the second polymer into: (i) regions between adjacent ones of the bars, (ii) a first space between a lower surface of each bar and a first opposing surface of a second vacuum injection tool, and (iii) a second space between an upper surface of each bar and a second opposing surface of the second vacuum injection tool. The method can include curing the second polymer, removing the bars from the second vacuum injection tool and placing the bars on a second dicing tape, and dicing through the second polymer while the bars are on the second dicing tape.

To facilitate injection of each polymer into the space between the lower surface of each bar and the opposing surface of the vacuum injection tool, the rectangular prism-shaped bars can be supported on projections in the vacuum injection tool(s).

The method can facilitate fabricating multiple light guides in a wafer-level process so that many (e.g., tens, hundreds or even thousands) light guides are manufactured in parallel as part of the same process.

In another aspect, the present disclosure describes a light guide including a rectangular prism-shaped bar, a first polymer cladding on four sides of the rectangular prism-shaped bar, and a second polymer cladding disposed on the first polymer cladding on the four sides of the rectangular prism-shaped bar. The second cladding is composed of a polymer different from the first cladding. Fifth and sixth sides of the rectangular prism-shaped bar are exposed (i.e., not covered by the first and second claddings).

As noted above, in some implementations, a metal layer can be used as the material for the first cladding instead of the first polymer.

In some implementations, the bars are composed of sapphire or other material having a refractive index of at least 1.7 at a wavelength of 400 nm. In some instances, the thickness of each of the first and second claddings is in a range of 100 μm-150 μm. The material of the first cladding can be selected, for example, based on its optical properties. The material of the second cladding is, in some cases, substantially opaque to a particular wavelength or range of wavelengths of radiation (e.g. ambient or infra-red light).

Other aspects, features and advantages will be readily apparent from the following detailed description, the accompanying drawings, and the claims.

DETAILED DESCRIPTION

Figure 1:
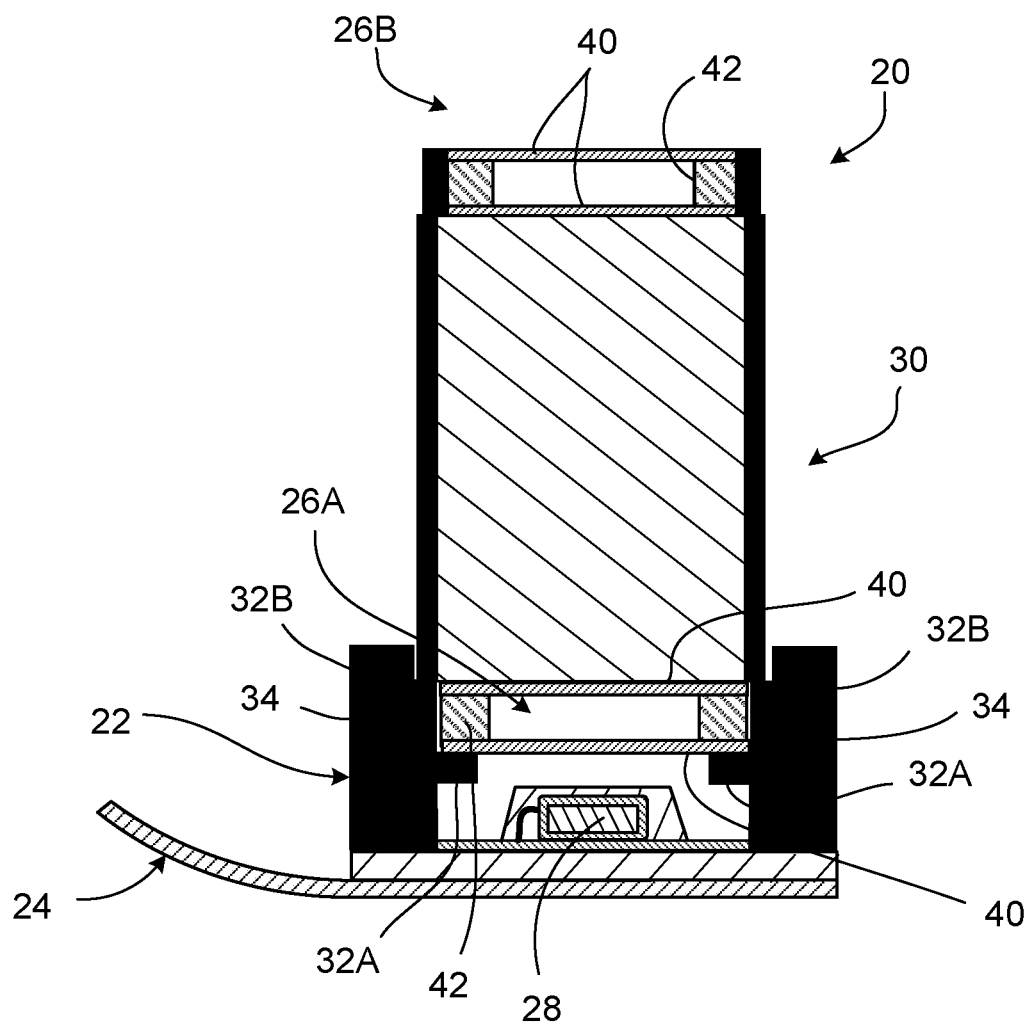
FIG. 1 illustrates an example of an optoelectronic module including a light guide.

FIG. 1 illustrates an example of an optoelectronic module 20 that includes a light guide 30. The light guide 30 can take the form, for example, of a rod or slab composed of sapphire or other high refractive index glass (e.g., Schott N-SF14, Ohara S-LAH59, Hoya TAF3D) or polymer (e.g., Solvay R-5000, Mitsui MR-174) having a refractive index of at least 1.7 at a wavelength of 400 nm. Sapphire, for example, has a refractive index of about 1.786 (ordinary ray) at 400 nm.

The illustrated module 20 further includes a sensor subassembly 22 mounted on a circuit substrate 24 such as a flexible circuit cable or other PCB. In the illustrated example, the sensor subassembly 22 includes an active optoelectronic device such as a light sensor (e.g., a photodiode, or a CCD or CMOS sensor) 28 that includes radiation sensitive elements (e.g., pixels). In some cases, the device 28 is implemented as an integrated circuit (IC) semiconductor chip or as an application-specific integrated circuit (ASIC) semiconductor chip.

In some cases, the module 20 includes an emitter subassembly that is operable to emit radiation of a particular wavelength or range of wavelengths. In such cases, emitter subassembly can include an optoelectronic device such as a light emitter (e.g., a light emitting diode (LED), infra-red (IR) LED, organic LED (OLED), infra-red (IR) laser or vertical cavity surface emitting laser (VCSEL)). Although the following paragraphs describe a module that includes a sensor subassembly, the description also is applicable to modules that include an emitter subassembly.

Figure 2:
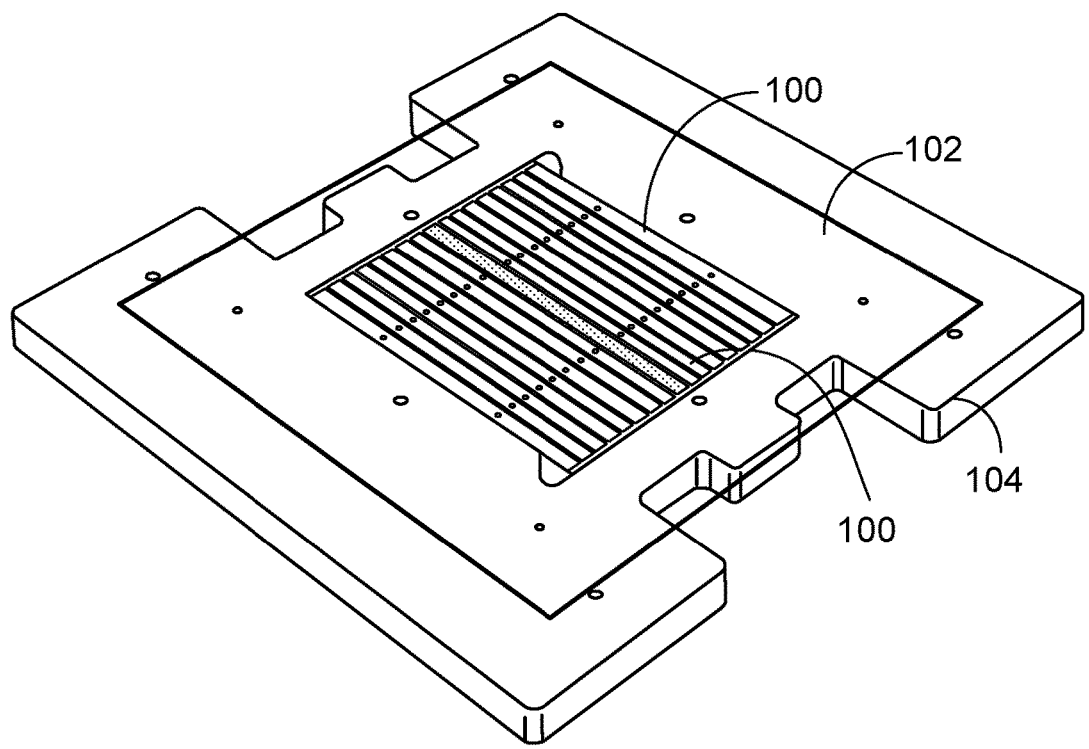
FIGS. 2 and 3 show an example of multiple sapphire bars disposed on a vacuum injection tool.

In the example of FIG. 2, a stack of optical subassemblies, including the light guide 30, is disposed over the sensor subassembly 22. In the illustrated example, a lower optical subassembly 26A and an upper optical subassembly 26B are included in the stack of optical subassemblies and can be implemented, for example, as an optical diffuser or infra-red (IR) absorber.

Figure 3:
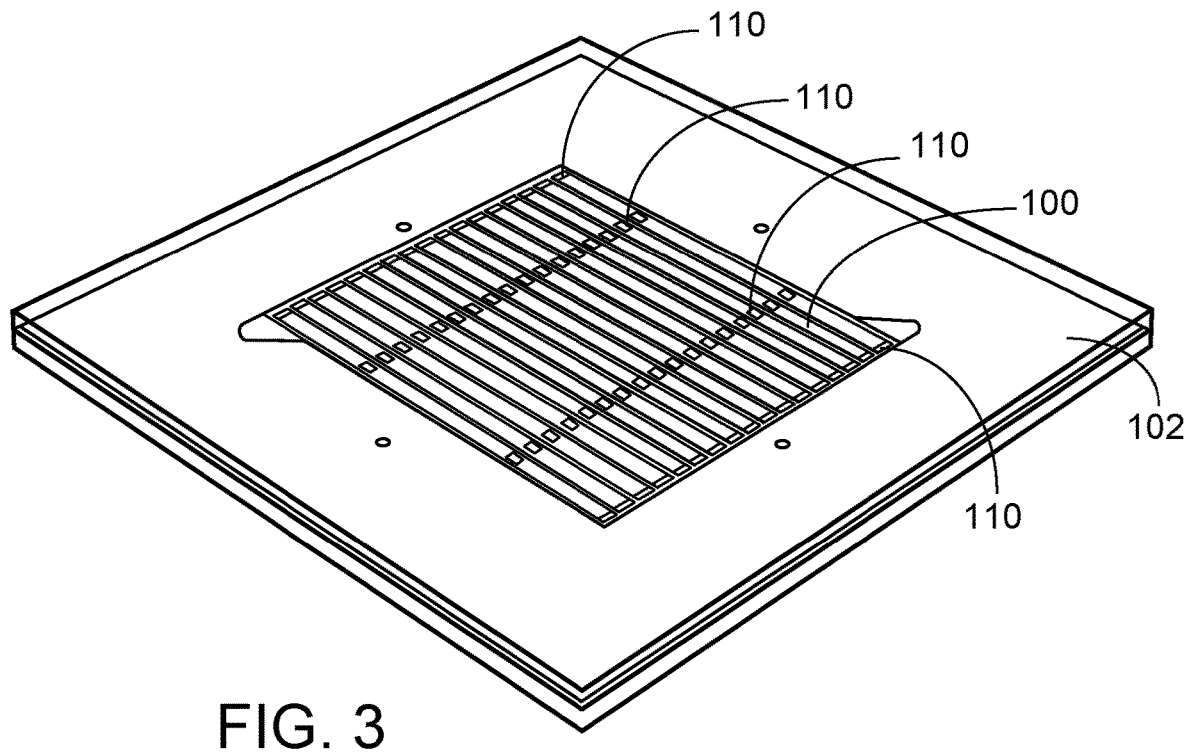

FIGS. 2 through 12 illustrate steps for manufacturing multiples light guides 30 in a wafer-level process. As shown in FIG. 2, multiple sapphire bars 100 are placed side-by-side on a lower plate 102 of a vacuum injection tool. In the illustrated example, seventeen sapphire bars 100 are placed, for example, by pick-and-place equipment on the lower plate 102. A different number of sapphire bars (or bars of another high refractive index material) may be provided in other implementations. Each bar 100 can have the shape, for example, of a rectangular prism. In the illustrated example, the lower plate 102 rests on a vacuum chuck 104. As indicated by FIG. 3, each sapphire bar 100 can be supported by multiple projections 110 such that a small space is present between the bottom of each bar 100 and the planar surface of the of lower plate 102. In the illustrated example, each sapphire bar 100 is supported by four projections 110 (i.e., one at either end of the bar and two along the middle section of the bar). However, in other implementations, the bars 100 can be supported by a different number of projections 110. In general, it can be advantageous to provide the supporting projections 110 at locations where each of the bars 110 subsequently will be diced into individual light guides.

Figure 4:
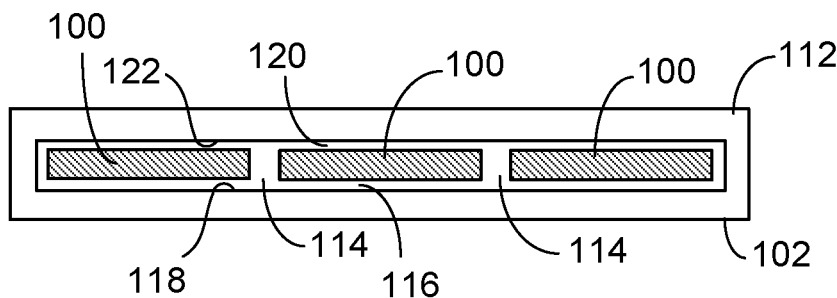
FIGS. 4, 5, 6, 7, 8, 9, 10 and 11 illustrate various stages in a wafer-level process for manufacturing light guides.

FIG. 4 illustrates an example in which three sapphire bars 100 are disposed side-by-side in a vacuum injection tool that includes a lower plate 102 and an upper plate 112. Adjacent bars 100 are separated from one another by a small space 114 into which a first curable polymer can be injected. Further, because the bars 100 are supported at discrete locations along their length by the projections 110 (not shown in FIG. 4), a small space (e.g., on the order of 100-150 µm) 116 is present between the bottom surface of each bar 100 and opposing surface 118 of the lower plate 102 of the vacuum injection tool. Likewise, a small space 120 (e.g., on the order of 100-150 µm) is present between the top surface of each bar 100 and the opposing surface 122 of the upper plate 112 of the vacuum injection tool.

Figure 5:
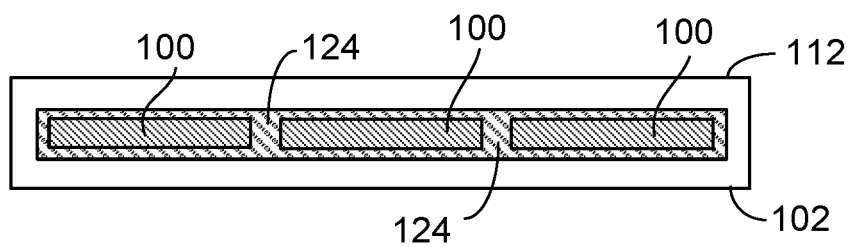

Next, as indicated by the FIG. 5, a first curable polymer 124, such as a high-refractive index epoxy, is injected into the spaces 114, 116, 120. The first polymer 124 can be selected, for example, to have particular optical properties that are desirable as a first, or inner, cladding for the light guides. For example, in some implementations, the core material (high refractive index material) provides transmission of 80% or more in the visible spectrum, and has a numerical aperture larger than 1. In general, the core material and the first cladding can be designed to satisfy the following equation, in which "NA" is the numerical aperture, and "n" is the refractive index.

$$NA = \sqrt{n_{core}^2 - n_{clad}^2},$$

In some cases, transmission in the cladding preferably is 70% or more in the visible spectrum. Therefore, in general, a black material with a low refractive index might not be suitable for use directly as the first cladding.

Figure 6:
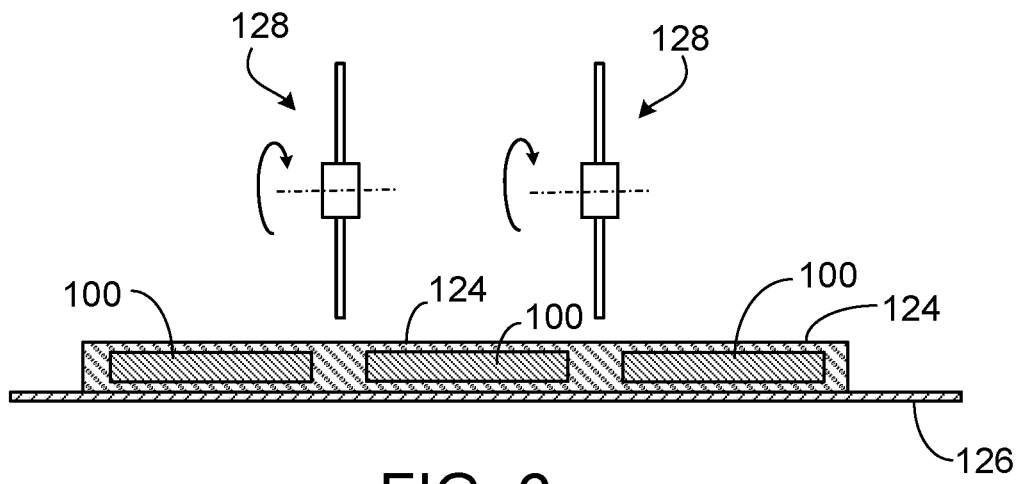

After hardening the polymer 124 (e.g., by thermal and/or UV curing), the sapphire bars 100 are removed from the vacuum injection tool and placed, for example, on dicing tape 126 or some other support (see FIG. 6). At this stage, the top and bottom surfaces, as well as the right and left side surfaces, of each sapphire bar 100 are covered by the first polymer material 124. The front and back side surfaces of each bar 100, however, can remain exposed.

Figure 7:
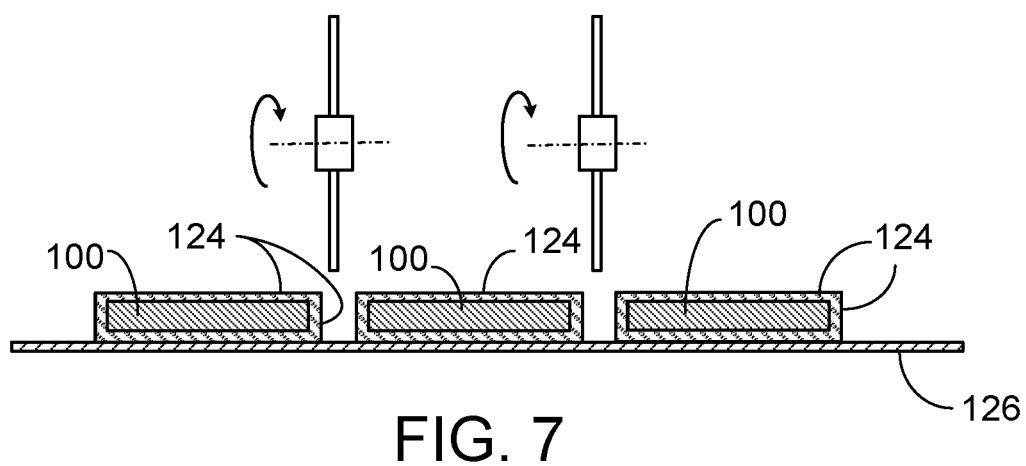

Next, as indicated by FIG. 6, the sapphire bars 100 are separated from one another, for example, by dicing through the cured polymer 124 at regions between adjacent ones of the bars 100. Dicing wheels 128 or other techniques can be used for this purpose. The dicing process should not remove all of the first polymer material 124 from the right and left sides of the bars 100. Instead, as shown in FIG. 7, a thin layer of the first polymer material 124 (e.g., on the order of 100-150 µm) for the inner cladding should remain on the left and right sides of each bar 100.

Figure 8:
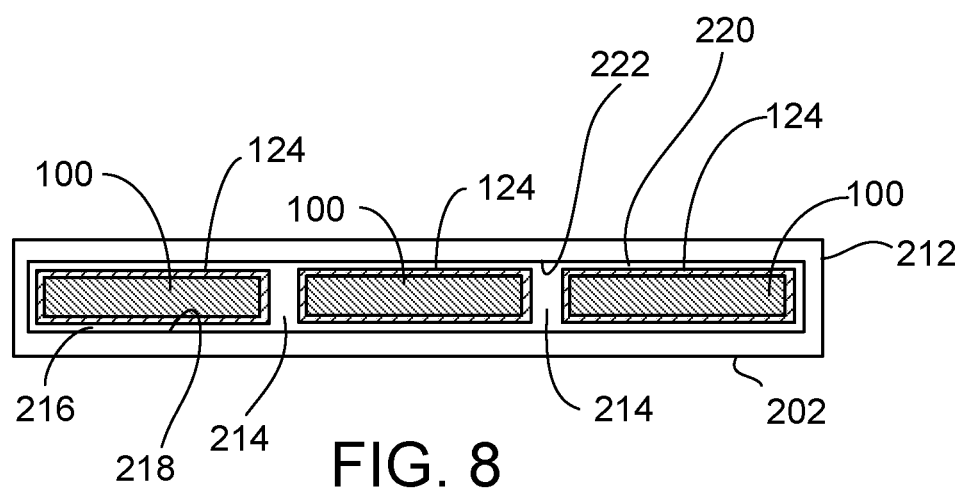

The bars 100, covered on four sides by the first polymer material 124, then are removed from the dicing tape 126 and are placed again in a vacuum injection tool, which can be similar to the vacuum injection tool described above. Thus, as indicated by FIG. 8, this vacuum injection tool can include a lower plate 202 and an upper plate 212. The bars 100 are supported at discrete locations along their length by the projections (not shown in FIG. 8)

Although the foregoing example describes the material for the first (i.e., inner) cladding 124 as a polymer, in some implementations, instead of polymer, the first cladding 124 can be a metal layer applied, for example, by spray coating.

As indicated by FIG. 8, adjacent sapphire bars 100 are separated from one another by a small space 214 into which a second curable polymer can be injected. Further, because the bars 100 are supported at discrete locations along their length by the projections (not shown in FIG. 8), a small space (e.g., on the order of 100-150 µm) 216 is present between the bottom surface of each bar 100 (i.e., the inner cladding) and the opposing surface 218 of the lower plate 202 of the vacuum injection tool. Likewise, a small space 220 (e.g., on the order of 100-150 µm) is present between the top surface of each bar 100 (i.e., the inner cladding) and the opposing surface 222 of the upper plate 212 of the vacuum injection tool.

Figure 9:
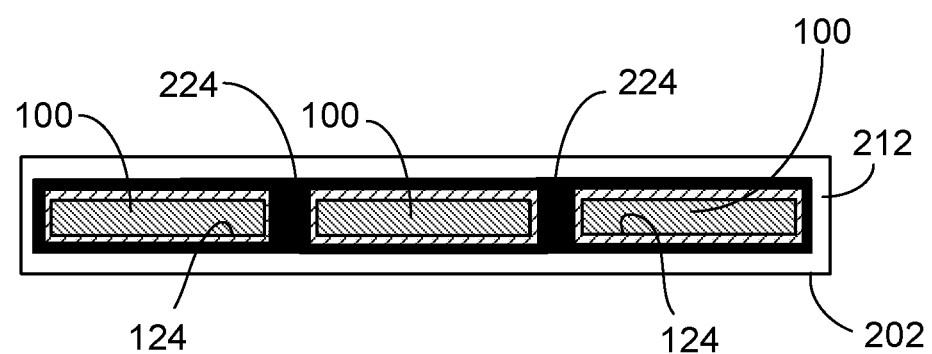
Figure 10:
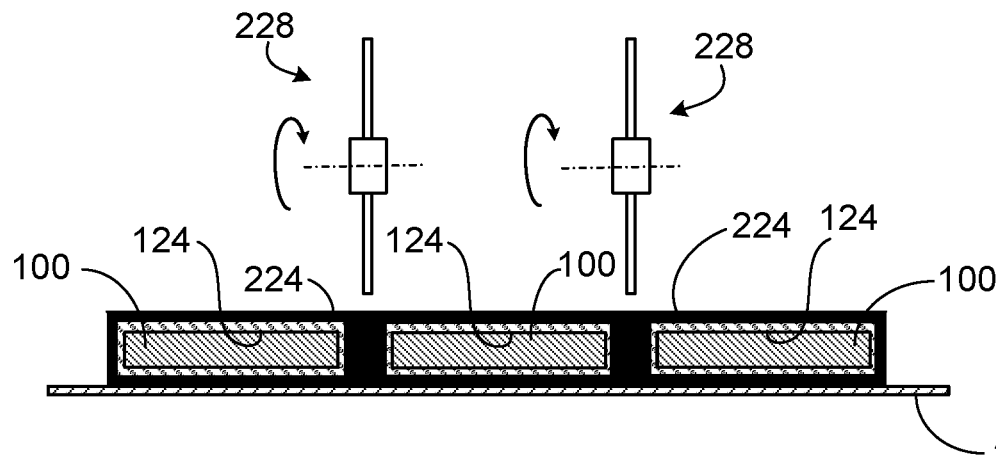

Next, as indicated by the FIG. 9, a second curable polymer 224, such as an opaque epoxy, is injected into the spaces 214, 216, 220. The second polymer 224 can include, for example, carbon black or other pigments that render the polymer 224 substantially opaque to a wavelength or range of wavelengths of radiation detectable by (or emitted by) the optoelectronic device 28. At this stage, the first cladding 124 on the top and bottom surfaces, as well as the right and left side surfaces, of each sapphire bar 100 is covered by the second polymer material 224, which serves as a second, or outer, cladding for the light guides. The second polymer material 224 is hardened, for example, by thermal and/or UV curing. The front and back side surfaces of each sapphire bar 100 can remain exposed.

After curing, the vacuum injection tool is placed, for example, on dicing tape 226 or some other support (see FIG.

Figure 11:
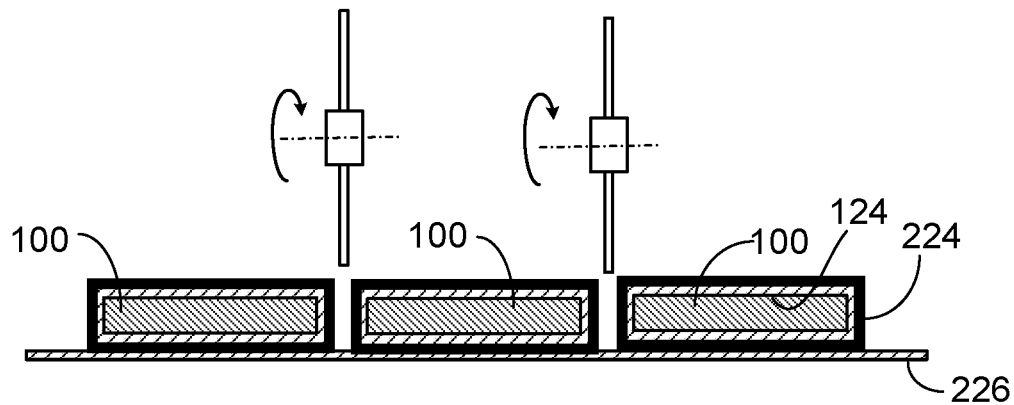

10). The sapphire bars 100 then are separated from one another, for example, by dicing through the cured polymer 224 at regions between adjacent ones of the bars 100. Dicing wheels 228 or other techniques can be used for this purpose. The dicing process should not remove all of the second polymer material 224 from the right and left sides of the bars 100. Instead, as shown in FIG. 11, a thin layer of the second polymer material 224 (e.g., on the order of 100-150 µm) for the second, or outer cladding, should remain on the left and right sides of each bar 100.

Figure 12:
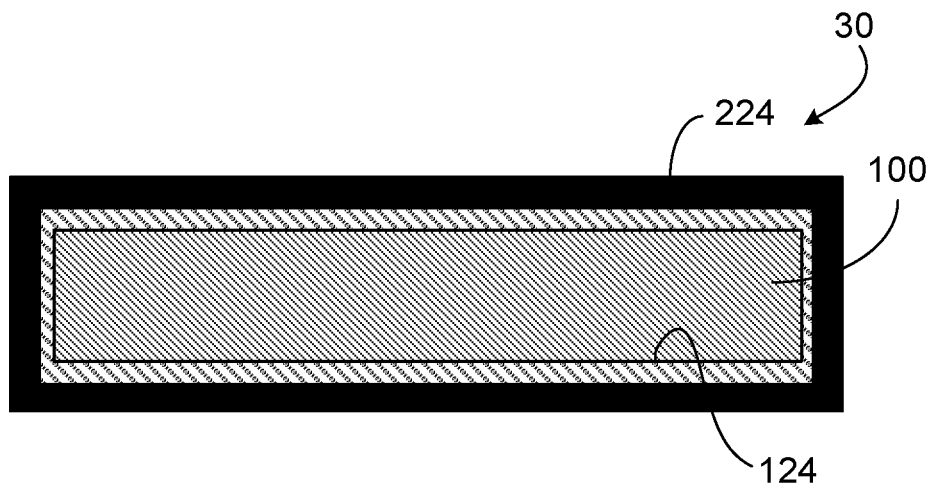
FIG. 12 shows an example of a light guide.

Each bar 100, including its first and second claddings 124, 224, also can be separated (e.g., by dicing) into multiple smaller rectangular prism light guides 30, as indicated by FIG. 12. Each resulting individual light guide 30 is composed of sapphire (or other high refractive index material) surrounded on four sides by a first, or inner, cladding 124 and a second, or outer, cladding 224. The other two sides, or faces, of each light guide 30 remain exposed and are not covered by the claddings 124, 224.

Following the dicing, the singulated prism light guides 30 can be removed from the dicing tape 226, and can be incorporated into an optoelectronic module such as the module 20.

In the particular example described above, the rectangular prism-shaped bars are composed of sapphire. In some implementations, the bars are composed of other high refractive index materials.

Other implementations are within the scope of the claims.

What is claimed is:

1. A method of manufacturing light guides, the method comprising:
    injecting a first polymer so as to cover four sides of each of a plurality of rectangular prism-shaped bars while the bars are disposed side-by-side in a vacuum injection tool;
    dicing through the first polymer in regions between adjacent ones of the bars wherein, after the dicing, at least a portion of the first polymer still covers each of the four sides of the bars;
    injecting a second polymer so as to cover the first polymer on the four sides of the bars; and
    dicing through the second polymer in regions between adjacent ones of the bars wherein, after dicing through the second polymer, at least a portion of the first polymer forms a first cladding on the four sides of the bars, and at least a portion of the second polymer forms a second cladding on the first cladding.

2. The method of claim 1 further including separating at least one of the bars into a plurality of singulated light guides, each of which comprises a portion of the bar surrounded on four sides by the first and second claddings.

3. The method of claim 2 wherein the separating includes dicing.

4. The method of claim 1 wherein the bars have a refractive index of at least 1.7 at a wavelength of 400 nm.

5. The method of claim 1 including injecting the first polymer into: (i) regions between adjacent ones of the bars, (ii) a first space between a lower surface of each bar and a first opposing surface of a first vacuum injection tool, and (iii) a second space between an upper surface of each bar and a second opposing surface of the first vacuum injection tool.

6. The method of claim 5 including curing the first polymer, removing the bars from the first vacuum injection tool and placing the bars on a first dicing tape, and dicing through the first polymer while the bars are on the first dicing tape.

7. The method of claim 6 including injecting the second polymer into: (i) regions between adjacent ones of the bars, (ii) a first space between a lower surface of each bar and a first opposing surface of a second vacuum injection tool, and (iii) a second space between an upper surface of each bar and a second opposing surface of the second vacuum injection tool.

8. The method of claim 7 including curing the second polymer, removing the bars from the second vacuum injection tool and placing the bars on a second dicing tape, and dicing through the second polymer while the bars are on the second dicing tape.

9. The method of claim 5 including supporting each of the bars on a plurality of projections in the first vacuum injection tool and subsequently supporting each of the bars on a plurality of projections in the second vacuum injection tool.

10. The method of claim 1 wherein the bars are composed of sapphire.

11. The method of claim 1 wherein a thickness of each of the first and second claddings is in a range of 100 µm-150 µm.

12. A method of manufacturing light guides, the method comprising:
    applying a metal layer so as to cover four sides of each of a plurality of rectangular prism-shaped bars;
    injecting a polymer layer so as to cover the metal layer on the four sides of each bar while the bars are disposed side-by-side in a vacuum injection tool; and
    dicing through the polymer layer in regions between adjacent ones of the bars wherein, after dicing through the polymer layer, at least a portion of the metal layer forms a first cladding on the four sides of the bars, and at least a portion of the polymer layer forms a second cladding on the first cladding.

13. The method of claim 12 wherein the metal layer is applied by spray coating.

* * * * *